United States Patent

Sakamoto et al.

[15] 3,687,495
[45] Aug. 29, 1972

[54] PIPE JOINT

[72] Inventors: Toshikazu Sakamoto, Osaka; Michio Adachi, Toyonaka, both of Japan

[73] Assignees: Matsushita Electric Industrial Co., Ltd.; Sakamoto Seiki Kabushiki Kaisha, Osaka, Japan

[22] Filed: March 23, 1970

[21] Appl. No.: 21,871

[30] Foreign Application Priority Data

March 28, 1969 Japan .......................44/24026

[52] U.S. Cl.................................285/356, 285/382.5
[51] Int. Cl...............................................F16l 17/00
[58] Field of Search...285/233, 356, 382.5, 393, 229, 285/382.4, 34 W

[56] References Cited

UNITED STATES PATENTS

| | | |
|---|---|---|
| 2,428,143 | 9/1947 | Chavayda..................285/233 |
| 1,872,863 | 8/1932 | Wood..................285/382.5 X |
| 2,469,851 | 5/1949 | Stecher et al.......285/382.5 X |
| 2,306,702 | 12/1942 | Koerner.....................285/226 |
| 2,724,602 | 11/1955 | Corey et al. ...........285/348 X |

*Primary Examiner*—Dave W. Arola
*Attorney*—Stevens, Davis, Miller & Mosher

[57] ABSTRACT

A pipe joint in which a bulged portion is formed adjacent to one end of a pipe; said pipe is fitted into a pipe fitting extending from an equipment, and the bulged portion is firmly pressed against the seat formed in the pipe fitting when a locking nut fitted over the pipe is screwed to the pipe fitting. A mechanically locked joint ensuring the complete liquid-tightness can be obtained in a simple manner.

1 Claim, 6 Drawing Figures

PATENTED AUG 29 1972

T. SAKAMOTO
AND
M. ADACHI
INVENTORS

BY *Stevens, Davis, Miller & Mosher*
ATTORNEYS

PIPE JOINT

The present invention relates to a pipe joint for use in a burner or the like in which the fuel is supplied from one vessel to another for combustion and has for its object to provide a pipe joint simple in construction yet capable of providing complete fluid-tightness.

Typical examples among various types of pipe joints of the prior art are illustrated in FIGS. 3, 4 and 5. In the pipe joint shown in FIG. 3, a pipe 11 is fitted into a hollow, externally threaded locking nut 12 and joined securely thereto by soldering or brazing. Thereafter, the pipe and fitting assembly is screwed into an internally threaded joint member 14 of an equipment such as a vessel 13. Internally threaded screw is designated by 15. This method of joining a pipe has some disadvantages such that liquid tends to leak when the nut 12 is loosened or when the screw threads of the joint member 14 and the locking nut 12 are not uniformly and not precisely threaded so that they do not engage with each other snuggly; and a welding process is required for joining the pipe 11 to the locking nut 12.

In another pipe joint shown in FIGS. 4 and 5, one end of the pipe 11 is formed into a funnel shape or flarred as shown so as to provide a flange 16 which is abutted against the end face of the joint member 14. Thereafter, the locking nut 12 loosely fitted over the pipe 11 is screwed over the joint member 14. In this method of joining a pipe, the liquid-tightness is not attained, because of the lack of elasticity of the flange 16, and the leakage of fluid will be increased especially when the pipe 11 is bent or displaced angularly as shown in FIG. 5 because the deformation and displacement of the end of the pipe 11 tend to occur so that the flange 16 is moved away from the end face of the joint member 14.

In view of the above, the present invention contemplates to provide a pipe joint which is simple in construction yet capable of providing a complete liquid-tightness, thereby substantially eliminating the defects encountered in the pipe joints of prior art.

The above and other objects, features and advantages of the present invention will become more apparent from the following description of one illustrative embodiment thereof taken in conjunction with the accompanying drawings in which.

Figure 1:
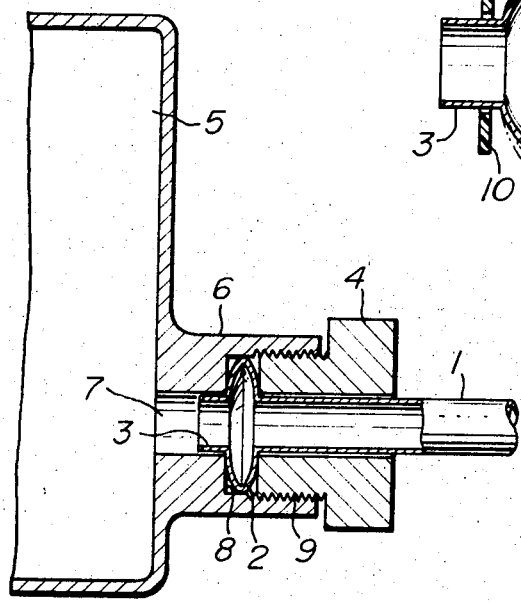
FIG. 1 is a sectional view of a pipe joint in accordance with the present invention.
Figure 2:
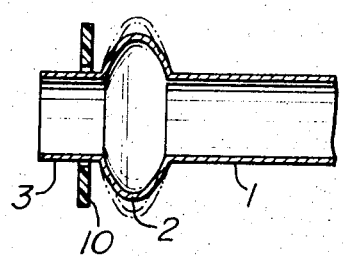
FIG. 2 is for explanation of the deformation of a bulged portion of a pipe when joined.
Figure 3:
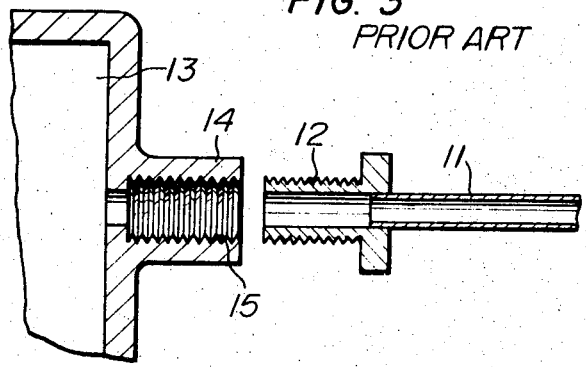
FIG. 3 is an exploded sectional view of one conventional pipe joint.
Figure 4:
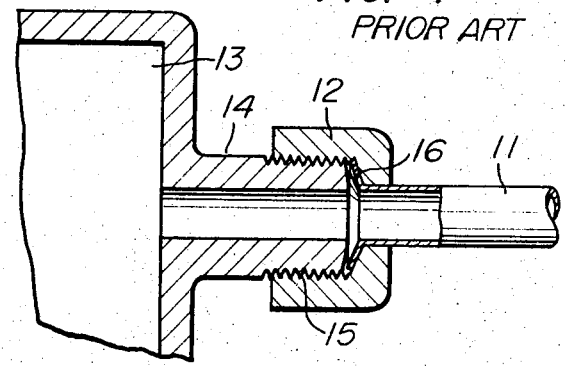
FIG. 4 is a sectional view of another conventional pipe joint.
Figure 5:
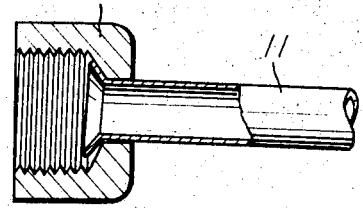
FIG. 5 is for explanation of an erratic joint thereof.

Referring first to FIGS. 1 and 2, reference numeral 1 designates a pipe made of a metal having a relatively high malleability such as soft copper; 2, a bulged portion formed at the end of the pipe 1; 3, a joint guide extending from the bulged portion 2; 4, a locking nut loosely fitted over the pipe 1 on the side opposite to the joint guide 3; 5, an equipment such as an fuel control unit or burner; 6, a pipe joint of the equipment 5; 7, a port of the pipe joint 6; 8, a seat formed at one end of the joint 6; and 9, internal thread of the joint 6. The joint guide 3 of the pipe 1 is fitted into the port 7 of the joint 6 while the bulged portion is pressed against the seat 8 when the locking nut 4 is screwed into the joint 6. Consequently, because of the malleability and elasticity of the bulged portion 2 of the pipe 1, the bulged portion 2 may be deformed as shown in FIG. 2 when it is pressed against the seat 8. When the dimensions of the bulged portion 2 is so designed as to contact closely with the inner surface of the joint 6, the liquid-tightness may be much improved. If required, a rubber packing 10 may be fitted over the joint guide 3 so as to further ensure the liquid-tightness.

In the above described pipe joint, the liquid within the equipment 5 may flows into the little space formed between the joint guide 7. The liquid flowed into said space does not flows further, because the bulged portion 2 is tightly compressed to the seat 8 and the periphery of the port 7 and the rose or erected portion of the bulged portion 2 are sealingly fitted whereby no space is formed therebetween. Even if the above described sealing became in incomplete by some reason, the further flowing of the liquid is prevented by the fact that the end of the locking nut 4 is abutted to the rose or erected portion of the bulged portion 2.

One example of the present invention is as follows: the pipe 1 was made of copper with the outer diameter of 8 mm and the wall-thickness of 0.6 mm; the width of the bulged portion 2 was 1.5 mm while its outer diameter was 10.3 mm; the diameter of the seal 8 was 11.2 mm; and the diameter of the port 7 was 8.2 mm.

Under the above described dimensional conditions, the complete fluid-tightness was attained. The locking nut 4 may be fitted over the pipe 1 before the bulged portion 2 is machined or after it is machined if the locking nut 4 is fitted over the pipe 1 from the end thereof remote from the joint guide 3.

APPLICATION

Figure 6:
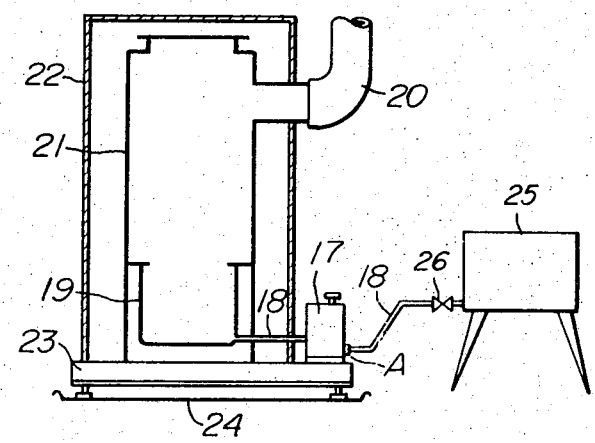
FIG. 6 is a diagrammatic sectional view of an oil burner to which is applied the present invention in one form.

The present invention may be applied in one form as shown in FIG. 6. The equipment shown in FIG. 6 is an oil burner in which the oil is introduced into a pot (burner) 19 from an oil tank 25 through a fuel valve 26, a fuel control unit 17 and a piping 18. The burner 19 is provided with a combustion cylinder 21 having an exhaust pipe 20. The fuel is burnt in the combustion cylinder. The combustion cylinder 21 is enclosed in a frame 22 which is turn is supported upon a base 23 which in turn is placed upon a stand 24.

The pipe joint in accordance with the present invention is used to joint the pipe 18 to the fuel control unit 17 at A. The leakage of the fuel can be completely prevented.

ADVANTAGES AND FEATURES OF THE INVENTION

Because of the elasticity of the bulged portion of the pipe, it may be firmly pressed against the seat of the joint when the locking nut is tightened so that the liquid-tightness can be effectively achieved. Because of the provision of the joint guide of the pipe which is fitted into the port of the joint of the equipment, the bulged portion may be located at a correct position relative to the seat of the joint and held in this position firmly when and after the locking nut is tightened, thereby improving the attainment of the fluid-tightness. When a packing is fitted over the guide there will occur no accidental clogging of the port with the packing even if the locking nut is tightened. The bulged portion may be formed by striking the end portion of the pipe, which is fitted over a die or the like, in a very simple manner so that there arises no problem in forming the bulged portion. Even when the pipe is bent or displaced angularly, the elasticity of the bulged portion may compensate for the deformation thereof so that there will occur no loosening between the pipe and the joint.

The pipe joint in accordance with the present invention simple in construction has various advantages as described above and can eliminate completely the defects encountered in the prior art pipe joint.

The present invention has been so far described with particular reference to one illustrative embodiment thereof, but it will be understood that variations and modifications can be effected without departing from the true spirit of the present invention as described hereinabove and as claimed in the appended claims.

What is claimed is:

1. A pipe joint, comprising: an internally threaded first pipe member having an internal annular shoulder means at the base of the threaded portion thereof, an externally threaded second pipe member having an axial bore therethrough and a radial face at one end thereof, a tubular conduit extending through one of said members and having a radially bulged portion adjacent to an end thereof, said conduit being of a relatively malleable material and said bulged portion being sealingly seated on one side thereof against said shoulder means and on the other side thereof against said radial face, said first and second members being threadedly engaged with each other whereby said bulged portion is axially compressingly deformed and simultaneously radially expanded between said members with said shoulder means and said radial face sealingly bearing against the opposite sides of said bulged portion, wherein said first pipe member is provided with an unthreaded bore portion adjacent to said shoulder means, and the diameter thereof is such that the circumferential periphery of said bulged portion sealingly engages the circumferential unthreaded wall of said bore pursuant to said bulged portion being radially expanded as mentioned.

* * * * *